Nov. 23, 1954  T. W. BARNES  2,694,815
THREAD CUTTING APPARATUS
Filed Aug. 31, 1951  8 Sheets-Sheet 1

Tracy W. Barnes,
Inventor.
Koenig and Pope,
Attorneys.

Nov. 23, 1954

T. W. BARNES 2,694,815

THREAD CUTTING APPARATUS

Filed Aug. 31, 1951

Tracy W. Barnes,
Inventor.
Koenig and Pope,
Attorneys.

Nov. 23, 1954    T. W. BARNES    2,694,815
THREAD CUTTING APPARATUS
Filed Aug. 31, 1951    8 Sheets-Sheet 3

Tracy W. Barnes,
Inventor.
Koenig and Pope,
Attorneys.

Nov. 23, 1954     T. W. BARNES     2,694,815
THREAD CUTTING APPARATUS
Filed Aug. 31, 1951     8 Sheets-Sheet 4

Nov. 23, 1954  T. W. BARNES  2,694,815
THREAD CUTTING APPARATUS
Filed Aug. 31, 1951  8 Sheets-Sheet 5

Tracy W. Barnes,
Inventor.
Koenig and Pope,
Attorneys.

Nov. 23, 1954

T. W. BARNES

2,694,815

THREAD CUTTING APPARATUS

Filed Aug. 31, 1951

Tracy W. Barnes,
Inventor.
Koenig and Pope,
Attorneys.

Nov. 23, 1954     T. W. BARNES     2,694,815
THREAD CUTTING APPARATUS Filed Aug. 31, 1951     8 Sheets-Sheet 8

United States Patent Office 2,694,815
Patented Nov. 23, 1954

2,694,815

THREAD CUTTING APPARATUS

Tracy W. Barnes, Webster Groves, Mo., assignor to John Ramming Machine Company, St. Louis, Mo., a corporation of Missouri Application August 31, 1951, Serial No. 244,659

17 Claims. (Cl. 10—120.5)

This invention relates to thread cutting apparatus, and more particularly to die heads used in such apparatus for cutting external threads on pipes.

Among the several objects of the invention may be noted the provision of in a thread cutting apparatus of an improved die head particularly for cutting external threads on pipes; the provision of a die head of this class of the type having tangential receding chasers for cutting taper threads; the provision of a die head of this class having an improved quick-opening mechanism for effecting retraction of the chasers from the work at the termination of the thread cutting operation; the provision of a die head of this class of such construction as to have relatively large bearing surfaces on all sliding parts; the provision of a die head of this class wherein each chaser may be readily adjusted to insure equal distribution of cut; the provision of a die head of this class which readily allows for making a roughing and finishing pass when an exceptionally smooth finish is required; and the provision of a die head having all the above features which is characterized by rugged simplicity in both operation and adjustment. Other features will be in part apparent and in part pointed out hereinafter.

The invention accordingly comprises the elements and combinations of elements, features of construction, and arrangements of parts which will be exemplified in the structures hereinafter described, and the scope of which be indicated in the following claims.

In the accompanying drawings, in which one of various possible embodiments of the invention is illustrated.

Similar reference characters indicate corresponding parts throughout the several views of the drawings.

Figure 1:
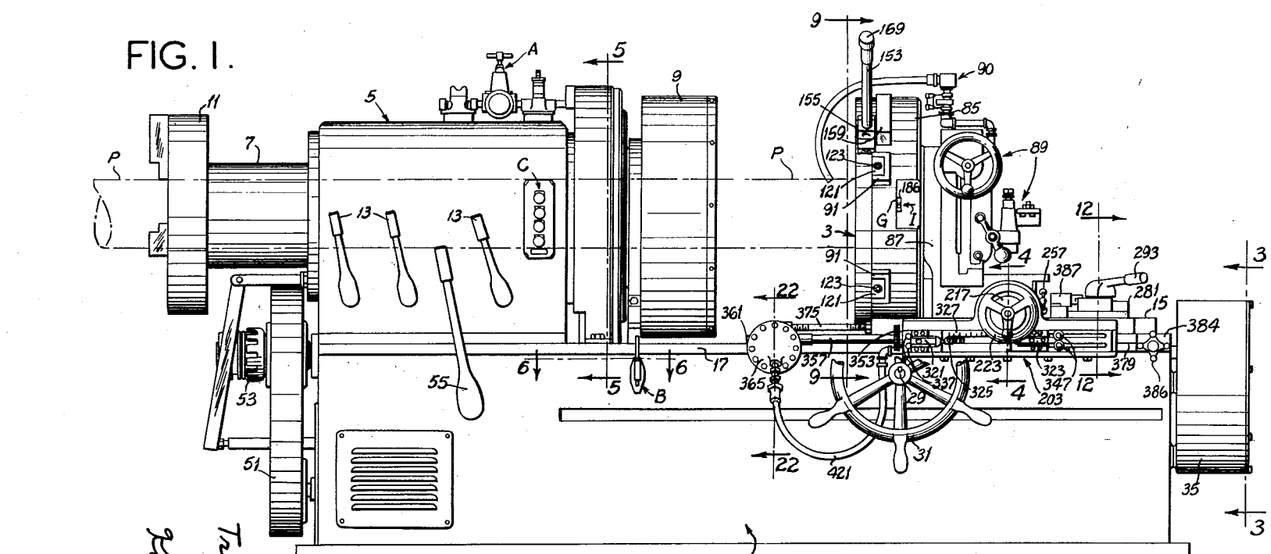
Fig. 1 is a front elevation of a thread cutting apparatus embodying a die head of the invention.
Figure 3:
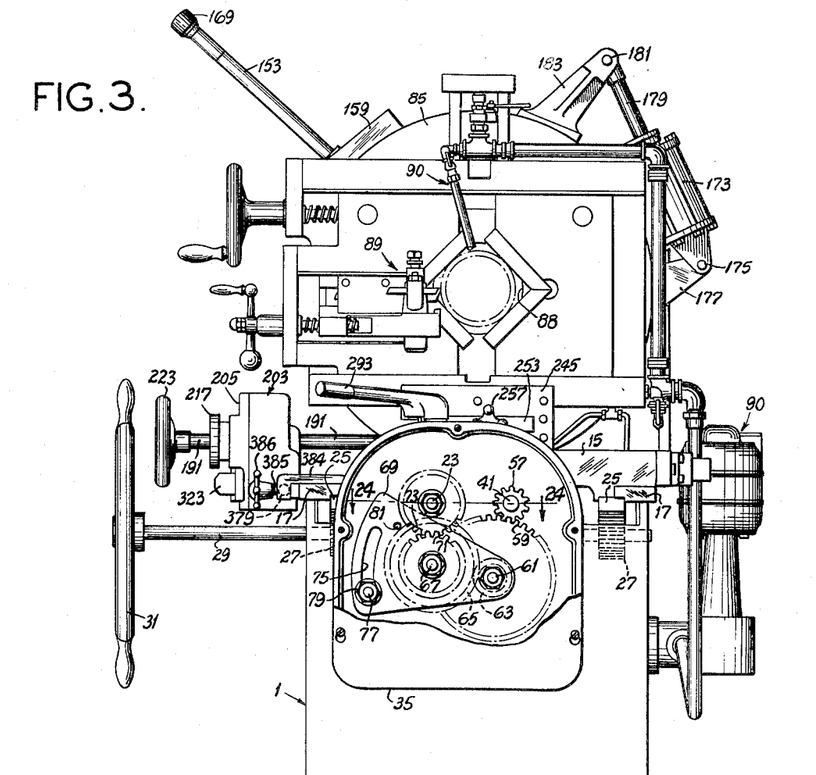
Fig. 3 is an enlarged right end elevation of Fig. 1, with parts broken away on line 3—3 of Fig. 1.

Referring to the drawings, first more particularly to Figs. 1 and 3, there is shown a pipe threading machine comprising a bed 1 on which a die head 3 of this invention is slidable toward and away from a headstock 5 at the left end of the bed as viewed in Fig. 1. Rotary in the headstock is a tubular arbor 7 having an air-operated power chuck 9 at its inboard end and a chuck 11 at its outboard end. The headstock contains speed change gearing, not illustrated in detail as being well known in the art, through which the arbor and chucks are driven. Speed change levers are indicated at 13. Air supply means for the chuck 9 is indicated at A. A control for this chuck is indicated at B. Chuck constructions suitable for chucks 9 and 11 are known and since the details of their construction are not material to this invention, no further description thereof is believed necessary. It will be understood that a pipe P to be threaded is inserted through the arbor 7 and gripped therein by the chucks for rotation, while being held against axial movement. The end of the pipe to be threaded extends out of the chuck 9 to the right as viewed in Fig. 1.

The die head 3 is mounted on a carriage 15 movable on ways 17 on opposite sides of the bed. The carriage floats on spring-loaded roller bearings 19 (Fig. 14) to reduce sliding friction. The carriage has a split nut 21 (Fig. 12) adapted to mesh with a lead screw 23 for driving the die head toward the headstock. The carriage also has a pair of longitudinally extending racks 25 (see Figs. 3, 12 and 14) engaged by pinions 27 on a shaft 29 having a handwheel 31 for manually moving the carriage when the split nut is released. The lead screw is journalled at its right end in a bearing 33 (Fig. 24) in a change gear housing 35 at the right end of the bed and is journalled at its left end in a bearing 37 (Figs. 5 and 6) carried by a bearing plate 39 of the headstock. The lead screw is driven through change gearing in the housing 35 from a connecting shaft 41 (Figs. 3, 5, 6 and 24). Shaft 41 is journalled at its right end in a bearing 43 (Fig. 24) in the housing 35 and is fixed at its left end (Fig. 6) to the output shaft 45 of the headstock to be driven thereby. Shaft 45 carries a pinion 47 (Figs. 5 and 6) in mesh with a gear 49 on the arbor 7 for driving the arbor. The power input to the headstock is derived from an electric motor (not shown) housed in the bed through a drive in a housing 51 (Fig. 1) and a clutch 53 controlled by a lever 55. A push button control for the motor is shown at C in Fig. 1.

Figure 24:
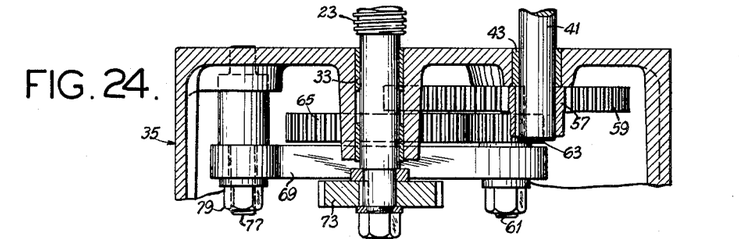
Fig. 24 is an enlarged section taken on line 24—24 of Fig. 3.

The change gearing in housing 35, illustrated in Figs. 3 and 24, comprises a pinion 57 fixed on the end of shaft 41 in mesh with a gear 59 on a fixed stud 61. Gear 59 is part of a cluster having a pinion 63. Pinion 63 is in mesh with a gear 65 on a stud 67 journalled in a sector plate 69 swingable on the stud 61. Fixed on the stud 67 is a pinion 71 in mesh with a change gear 73 on the end of the lead screw. The sector plate has an arcuate slot 75 receiving a fixed stud 77 having a nut 79 threaded thereon for locking the sector plate in adjusted position. Change gears of different sizes may be used at 73 to change the speed of the lead screw to cut threads of different pitch (for example, 8, 10 or 11½ threads per inch). Provision is made for left hand threading by having a tapped hole 81 in the sector plate adapted to receive a bolt carrying an idler gear. These may be kept in storage in the housing 35.

Figure 9:
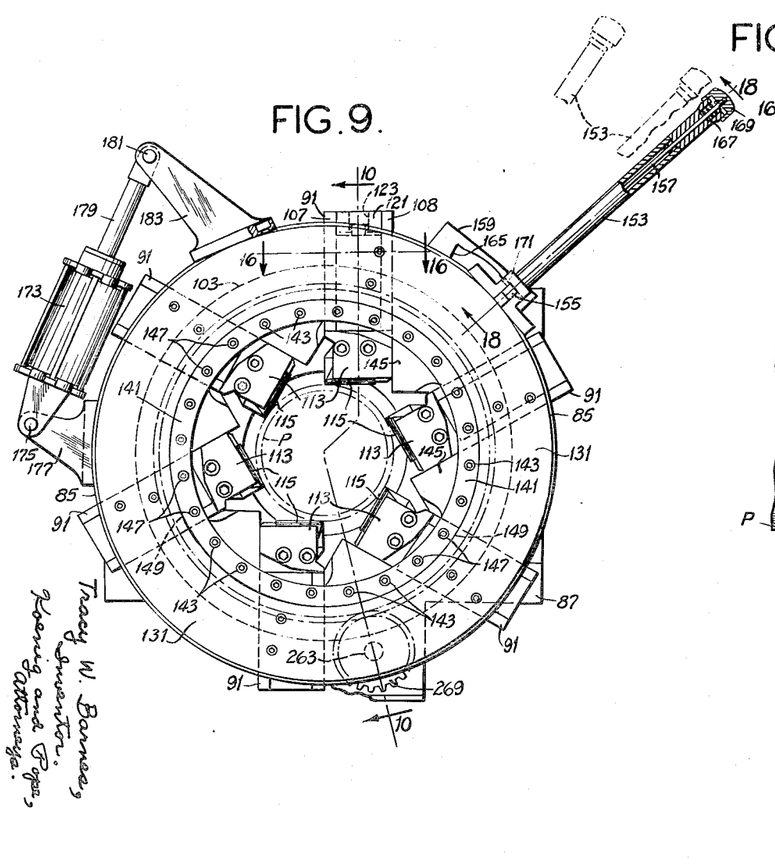
Fig. 9 is a view taken on line 9—9 of Fig. 1.
Figure 10:
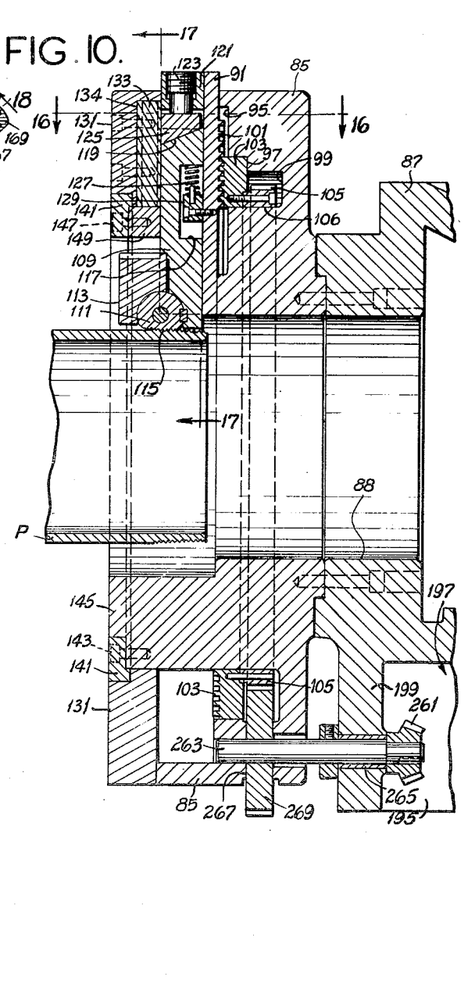
Fig. 10 is an enlarged section taken on line 10—10 of Fig. 9.
Figures 16, 17, 18:
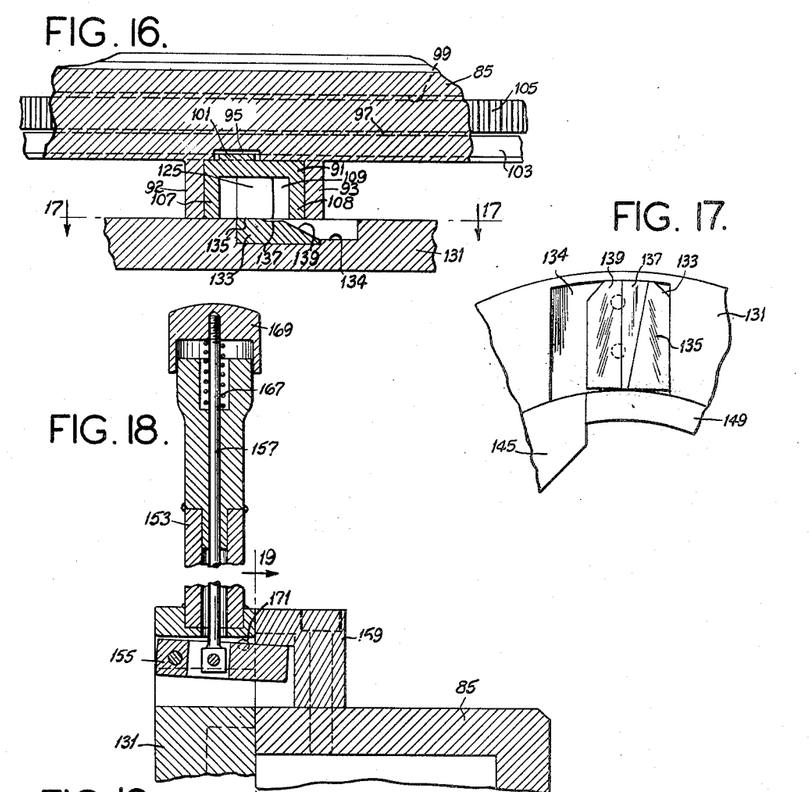
Fig. 16 is a section taken on line 16—16 of Figs. 9 and 10.
Fig. 17 is a view taken on line 17—17 of Figs. 10 and 16.
Fig. 18 is an enlarged section taken on line 18—18 of Fig. 9.

The die head 3, illustrated in detail in Figs. 9, 10 and 16, comprises a ring-shaped body 85 having a central opening sufficiently large to receive a pipe of the largest diameter within the range of the machine. The die head body 85 is carried by a stand 87 (also see Fig. 1) mounted on the carriage 15 in axial alignment with the arbor 7. The stand has an opening 88 in line with the opening in the body 85. It carries mechanism generally indicated at 89 for cutting off, beveling and reaming the end of a pipe chucked in the headstock and extending through the openings in the die head and stand. Fig. 3 also shows means 90 for pumping coolant. Mechanism 89 and means 90 are known in the art and since they do not constitute a part of this invention will not be further described.

The die head body 85 carries a plurality of carriers or slides 91 for tangential inward and outward sliding movement on that face of the body toward the headstock. Six such slides are provided, spaced at equal intervals around the body. Each slide is confined sidewise by a pair of ribs 92 and 93 (Fig. 16) on the face of the body toward the headstock, the ribs defining a tangential guideway for the slide. Each slide bears against the face of the body toward the headstock, and in this face in the bottom of each guideway is a tangential recess 95 (Figs. 10 and 16). The six recesses 95 open into an intersecting annular recess 97 which in turn opens into an annular recess 99 of smaller diameter. Recesses 95 accommodate partial scrolls 101 on the back faces of slides 91 in mesh with a scroll ring 103 coaxial with and rotary with respect to the die head body in the annular recess 97. Fixed to the scroll ring in coaxial relation is a gear 105 located in the annular recess 99. The scroll ring and gear are rotary on the annular cylindrical shoulder 106 which defines the radially inner side of the recesses 97 and 99 and which serves as a hub for the scroll ring and gear.

Each slide 91 has side flanges 107 and 108 (Fig. 16) extending in the direction toward the headstock. Associated with each slide is a chaser assembly including a chaser holder 109. This is capable of sliding movement relative to the slide in the direction of movement of the slide and is confined sidewise by the flanges 107 and 108. A tangential chaser 111 is held clamped to the holder at its inner end by a clamp 113. The chaser has a thread cutting face 115 transverse to the direction of movement of the slide and holder. The chasers and holder shown in Figs. 9 and 10 are more particularly described and claimed in my copending application entitled Thread Chaser and Chaser Assembly, Serial No. 243,142, filed August 22, 1951, now Patent No. 2,667,651 issued February 2, 1954. Each holder 109 has a recess 117 in its base toward the carrier 91 and a wedge surface 119 at its outer end which converges in the direction toward the headstock.

Fixed at the outer end of each slide 91 between its side flanges 107 and 108 is a block 121. Adjustably threaded in each block 121 is a screw 123, the inner end of which acts as an abutment for a wedge 125 interposed between the wedge surface 119 at the end of the holder and the inner end of the screw. Each wedge is capable of axial sliding movement to the left from the extended position illustrated in Fig. 10 (toward the bottom of the drawing as viewed in Fig. 16). Each holder 109 is biased outward relative to its respective slide 91 by a spring 127 in recess 117 reacting from a retainer 129 fixed to the slide and located in recess 117. The arrangement is such that when the wedge 125 is in the aforesaid extended position, the holder 109 is held against the bias of spring 127 in an innermost position relative to the slide. When the wedge is allowed to retract axially to the left as viewed in Fig. 10 from its extended position, spring 127 acts to move the holder 109 outward relative to the slide.

The position of the wedges 125 is controlled by a cam ring 131 (Figs. 9, 10, 16 and 17) having six wedge-controlling cams 133 spaced at equal intervals therearound located in recesses 134. As shown in Figs. 16 and 17, each cam has a first flat wedge-engaging face 135, a second wedge-engaging flat face 137 slightly lower (for example, .008" to .010" lower) than face 135, and a taper 139. The cam ring is rotary relative to the die head body 85 on a clamp ring 141 attached to the body 85 by screws 143 threaded in portions 145 of the body which extend toward the headstock between the slides 91. The clamp ring 141 holds the cam ring in position on the body and also has screws 147 holding arcuate blocks 149 which span the spaces between the portions 145 and back up the holders 109.

The cam ring 131 is rotary to any one of three positions viz., a finish cut position, a rough cut position, and an open-die position. In the finish cut position, the high faces 135 of the cams 133 engage the wedges 125 and hold the wedges in the fully extended position illustrated in Figs. 10 and 16, wherein the holders 109 are held in an innermost finish cut position with respect to the slides 91. In the rough cut position (cams moved to the left as viewed in Fig. 16), the lower faces 137 of the cams engage the wedges 125 and hold the wedges in a position slightly to the left of that shown in Fig. 9, as a result of which the holders 109 are held in an intermediate rough cut position slightly outward of their innermost position. When the cam ring is moved to the open-die position (cams moved further to the left as viewed in Fig. 16), the wedges ride down the tapers 139 of the cams (to the left as viewed in Fig. 10, downward as viewed in Fig. 16), as a result of which the holders 109 move outward under the bias of springs 127 relative to slides 91 to an open-die position.

Figure 19:
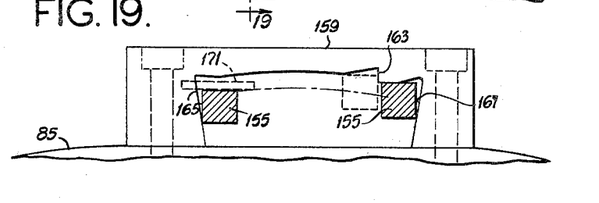
Fig. 19 is a section taken on line 19—19 of Fig. 18.

The cam ring has a handle 153 (Figs. 1, 3, 9 and 18) for manually moving it to any one of its three positions. It is adapted to be latched in any position by a latch 155 controlled by latch rod 157 slidable in the handle (Fig. 18), the latch being engageable with a three-position latch stop 159 fixed to the die head body 85. As shown in Fig. 19, the latch stop has three shoulders 161, 163 and 165 respectively determining the finish cut, rough cut and open-die positions of the cam ring. The latch rod is biased outward by a spring 167 reacting from the end of the handle against a cap 169 on the end of the rod. To enable the latch 155 to pass the shoulder 163, the cap is pressed inward to move the latch from behind the shoulder. If desired, a set screw may be threaded in a tapped hole 171 at the inner end of the handle to lock the latch out of engagement with the shoulder 163 if rough cutting is not desired. The finish cut position of the handle is shown in solid lines in Fig. 9; the rough cut position is shown in dotted lines; and the open-die position shown in dot-dash lines.

Figure 25:
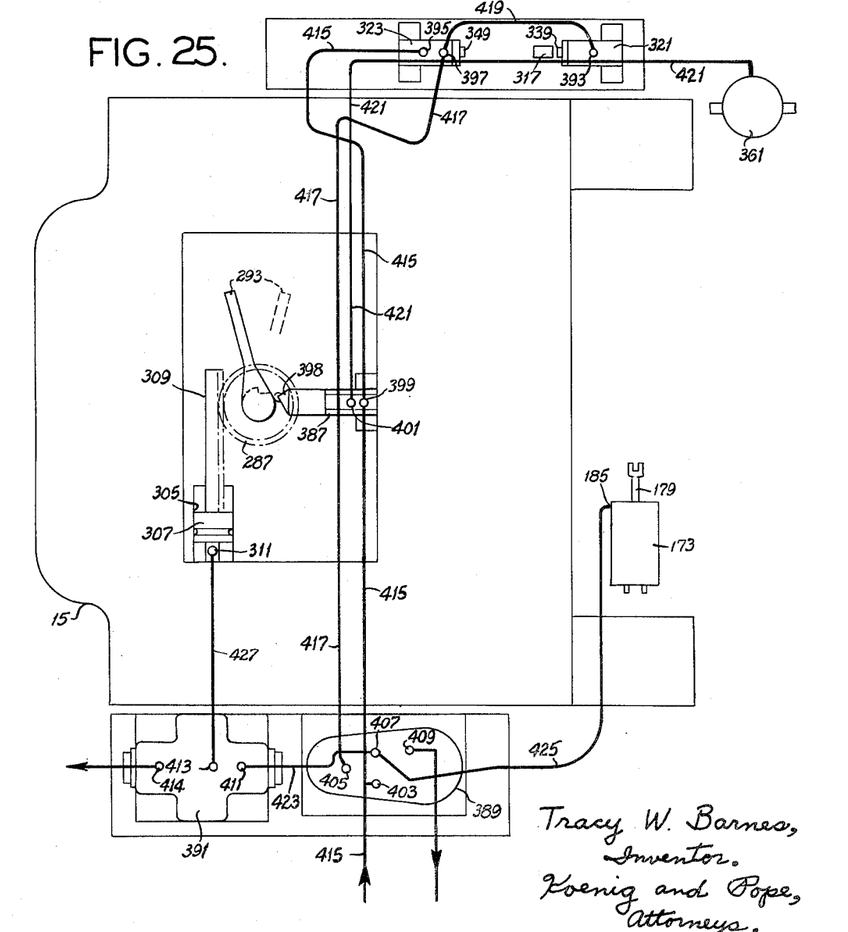
Fig. 25 is a fluid pressure system diagram.

The cam ring 131 is also adapted to be rotated from finish cut to open-die position by an air cylinder 173 (Figs. 3 and 9) pivoted at 175 to a bracket 177 fixed to the die head body 85 and having a piston rod 179 extending from a piston therein to a pin connection at 181 with a bracket 183 fixed to the cam ring. The cylinder has a port at 185 at its forward end (Fig. 25). When air under pressure is admitted to the cylinder through the port, the cam ring 131 is rotated counterclockwise as viewed in Fig. 9 (to the left as viewed in Fig. 16) away from its finish cut position. By venting the cylinder through the port, the cam ring may be returned to finish cut position.

Upon rotation of the scroll ring 103 in such direction as to move the carriers or slides 91 inward, assuming the cam ring 131 is either in finish cut or rough cut position, the holders 109 and chasers 111 carried thereby are moved inward, the screws 123 pushing the wedges 125 and holders inward without affecting the bias of springs 127. Upon rotation of the scroll ring 103 in the opposite direction to move the slides 91 outward, the holders 109 and chasers 111 are moved outward, the slides acting on the holders through retainers 129 and springs 127. On the periphery of the scroll ring 103 are graduations G (Fig. 1) corresponding to sizes of pipe within the range of the apparatus. These are visible singly through a window opening 186 (Fig. 1) in the die head body 85 toward the front of the apparatus, an index mark I being scribed on the body beside the window. The graduations G are so phased that when the scroll ring is rotated to a position wherein a particular pipe size graduation is visible in the window in line with the index mark, the cutting edges of the chasers are positioned for cutting pipe of that size. Adjustment of the chasers for equal distribution of cut is made by adjusting the screws 123.

In order to provide for receding action of the chasers as the die head is advanced toward the headstock by the lead screw to cut a taper thread, I provide a novel mechanism for effecting continuous controlled rotation of the scroll ring in response to movement of the die head toward the headstock. This mechanism comprises a train of gears carried by the carriage 15 for movement with the die head, the last gear of this train being the gear 105. The first or driving gear of this train is a pinion designated 187 (Figs. 2 and 4) and derives its rotation by rolling on a rack 189 as the carriage and die head are moved toward and away from the headstock. The train incorporates a speed selector generally designated 190 (Fig. 7) for varying the speed ratio as between the driving pinion 187 and the last gear 105.

More particularly, the train of gears comprises a shaft 191 (Figs. 2, 3, 4 and 7) extending transversely of the bed journalled in bearings 193 in the side walls 195 of a selector gear box 197 and extending forward from the box toward the front side of the apparatus. The side walls 195 of the box 197 and its forward end wall 199 and top wall 201 are formed as integral parts of the die stand 87. Fixed to the carriage 15 on the front side of the apparatus is a pinion and rack housing 203. This housing extends longitudinally of the apparatus, and has a front cover plate 205. The shaft 191 extends transversely through the housing and cover plate, being journalled in a bearing 207 in the backwall 209 of the housing (Fig. 4), and extending through a sleeve 211 journalled in a bearing 213 in the cover plate. The sleeve 211 is axially slidable in the bearing 213 and on the shaft 191, and is slidably keyed to the shaft as indicated at 215. The sleeve carries the driving pinion 187.

The sleeve 211 extends out from the cover plate 205 and has a knob 217 fixed upon its outer end. This knob carries a spring-biased detent 219 engageable in a notch 221 in the shaft 191 to hold the knob, the sleeve and the pinion 187 in the position illustrated in Fig. 4 wherein the pinion is in mesh with the rack. By pulling out on the knob, the pinion 187 is moved to the left as viewed in Fig. 4 out of mesh with the rack. On the outer end of the shaft 191 is a handwheel 223 for manually turning the shaft.

Figure 7:
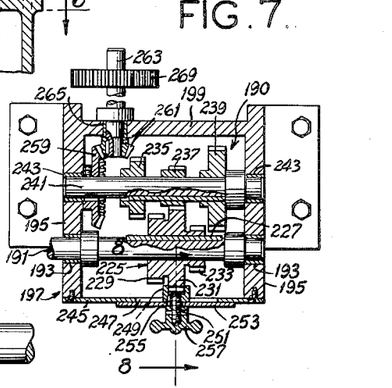
Fig. 7 is a horizontal section taken on line 7—7 of Fig. 4.
Figure 8:
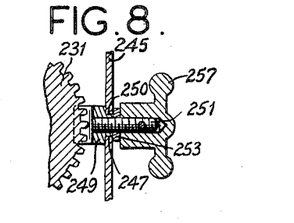
Fig. 8 is an enlarged vertical section taken on line 8—8 of Fig. 7.

A three-gear cluster 225 is axially slidable on the shaft 191 in the box 197 and keyed to the shaft as indicated at 227 for rotation therewith (Fig. 7). The gears of the cluster are designated 229, 231 and 233. These are adapted selectively to mesh with gears 235, 237 and 239, respectively, fixed on a countershaft 241 journalled at its ends in bearings 243 in the side walls 195 of the box 197 extending parallel to the shaft 191. The open end of the box is closed by a cover plate 245. This has a narrow horizontal slot 247. A shifter fork 249 straddling gear 231 has a narrow key 250 (Fig. 8) slidable in the slot. The fork is threaded on a screw 251 rotary in a plate 253 slidable on the face of cover plate 245 over the slot 247. The fork is held against rotation while being axially movable by a pin 255. Fixed on the outer end of the screw 251 is a handwheel 257. By turning the handwheel to draw the fork against the inside of the cover plate 245, the fork may be clamped in position to hold the cluster 225 in a desired speed setting. A bevel gear 259 is fixed on the countershaft 241. This gear is in mesh with a bevel pinion 261 fixed on a shaft 263 journalled in a bearing 265 in the forward end wall 199 of the box 197. The shaft 263 extends longitudinally of the apparatus from the box 197 into a recess 267 in the die head body 85 (Fig. 10). Fixed on the shaft 263 in this recess is a pinion 269 in mesh with the scroll ring gear 105.

As the carriage 15 is moved toward or away from the headstock, the shaft 191 is driven in one direction or the other by the rolling of pinion 187 on the rack 189, the rack being held against movement as will be later described. This effects rotation of the gear 105 and the scroll ring 103 through whichever of gear sets 229 and 235, 231 and 237, or 233 and 239 are in mesh, and through bevel gears 259 and 261 and pinion 269. The speed ratio as between the shaft 191 and the shaft 263 depends upon whichever of the gear sets are in mesh. The arrangement is such that upon movement of the carriage toward the headstock, the scroll ring is rotated in such direction as gradually to move the slides 91 and chaser holders 109 outward. Upon movement of the carriage in the opposite direction, the slides and chaser holders are gradually moved inward. The rate of movement may be changed in accordance with the taper of the thread to be cut by shifting the cluster 225 to establish a speed ratio appropriate for that taper. This is accomplished by turning the handwheel 257 to loosen the fork 249 from clamping engagement with the inside of cover plate 245 and shifting the fork (and the plate 253) to shift the cluster 225, then re-clamping. The left edge of the plate 253 is utilized as an index in conjunction with taper gauge marks 271 on the cover plate (Fig. 4) to indicate the setting.

Figures 11, 12, 13, 14, 15:
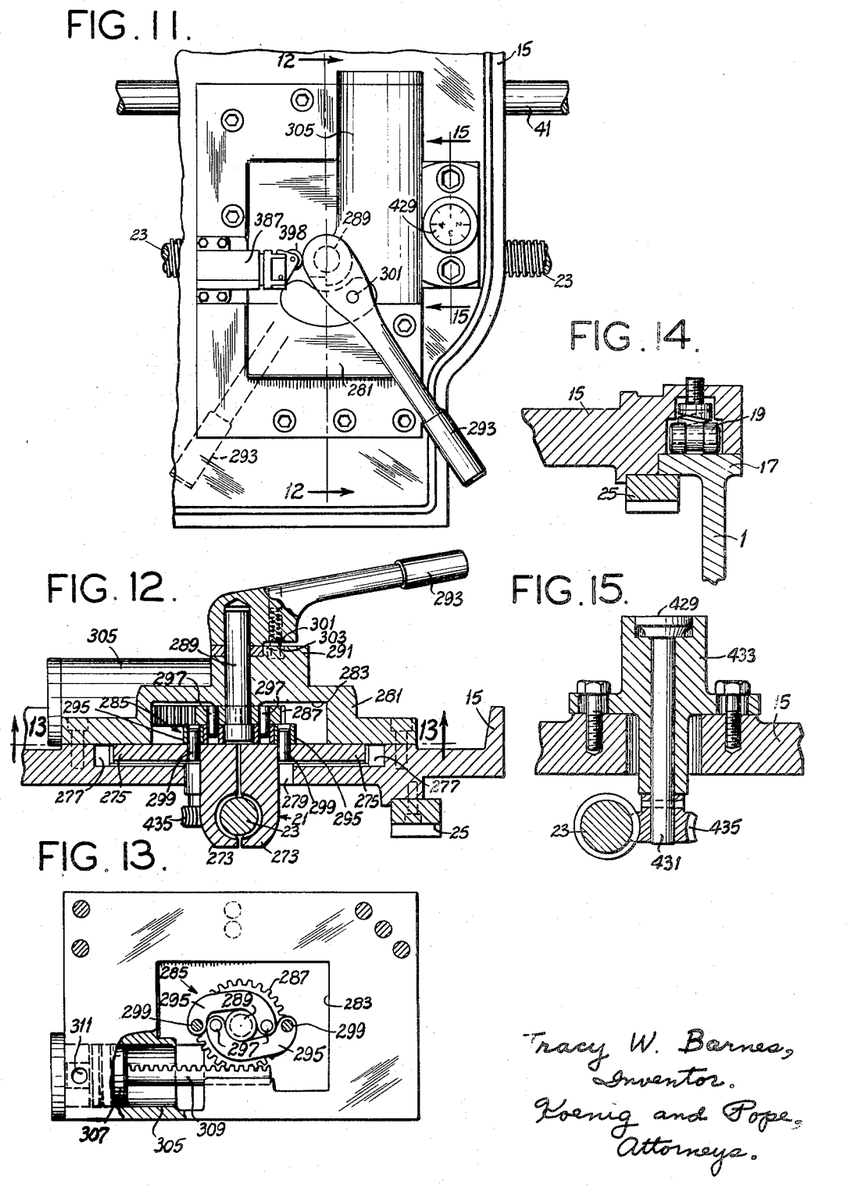
Fig. 11 is an enlarged fragmentary plan of a carriage of the apparatus.
Fig. 12 is a vertical section taken on line 12—12 of Figs. 1 and 11, on the same scale as Fig. 11.
Fig. 13 is a section taken on line 13—13 of Fig. 12.
Fig. 14 is a detail section illustrating a roller bearing for the carriage.
Fig. 15 is a vertical section taken on line 15—15 of Fig. 11.

The split nut 21 which is adapted to be engaged with the lead screw 23 for driving the carriage 15 consists of a pair of half-nuts 273 (Fig. 12). These are formed as integral parts of slide plates 275 which are slidable toward and away from one another transversely of the carriage 15, being guided in a recess 277 in the carriage. The half-nuts extend downward through an opening 279 in the carriage on opposite sides of the lead screw 23. The slide plates 275 are held in the recess 277 by a housing 281 fixed to the carriage. This housing has a recess 283 accommodating a crank mechanism 285 (Fig. 13) for moving the half-nuts toward and away from one another.

The crank mechanism 285 comprises a pinion 287 fixed on a vertical shaft 289 journalled in a boss 291 on the top of the housing 281. Fixed on the upper end of the shaft is a handle or lever 293. The pinion 287 is coupled to the slide plates 275 by a pair of C-shaped links 295 pin-connected at 297 to the pinion and at 299 to the slide plates. The pins at 297 function as crank pins. They are located on opposite sides of the vertical axis of the shaft 289. One link 295 extends from one pin 297 around one side of the shaft 289 to its pin connection at 299 to one slide plate, and the other link extends from the other pin 297 around the other side of the shaft to its pin connection at 299 to the other slide plate. The arrangement is such that when the pinion turns counterclockwise as viewed in Fig. 13, the slide plates 275 and the half-nuts are spread apart, and when the pinion is turned clockwise, the half-nuts are moved into meshing engagement with the lead screw 23. The lever 293 carries a spring-biased detent 301 engageable in a recess 303 in the top of the boss 291 to hold the lever and pinion 287 in the position for engagement of the half-nuts and the lead screw.

The housing 281 is also formed with an air cylinder 305 (Figs. 11–13), the axis of this cylinder extending horizontally and transversely of the carriage 15, and in the plane of and generally tangent to the pinion 287. A piston 307 is slidable in the cylinder. A rack 309 is fixed to the piston and meshes with the pinion 287. The cylinder has a port 311 behind the piston. The piston has a retracted position illustrated in Fig. 13. When air under pressure is supplied to the cylinder through the port 311, the piston and rack are moved forward to rotate the pinion 287 from its half-nut-engaging position illustrated in Fig. 13 to disengaging position. By venting the cylinder through the port 311, the piston may be returned to retracted position upon manually turning the lever 293 to engage the half-nuts with the lead screw 23.

Referring now to Figs. 2, 4, 20 and 21, the rack 189 is shorter than its housing 203 to be capable of longitudinal movement therein. It is slidable relative to the housing on a gib 313 adjustably positioned above the bottom of the housing 203 by adjusting screws 315. Adjacent its forward end toward the headstock, it carries an arm 317 which extends through an elongate horizontal slot 319 in the front cover plate 205 of the housing. This arm serves as a trip for two air valves 321 and 323 which are carried on the front cover plate 205 at the ends of the slot 319. It also carries a pointer 325 cooperable with a thread length scale 327 on the front cover plate 205. The pointer is shiftable relative to the arm 317 longitudinally of the apparatus, being retained in adjusted position by a screw 329. Each chaser has a throat presenting a wide cutting edge to prolong its useful life. The chasers travel through a distance corresponding to the throat length before they actually start to cut a thread. Accordingly, the thread length scale starts at a point spaced from a zero mark 0 a distance corresponding to the throat length. This allows for pre-travel of the chasers for a distance equal to the throat length before threading actually starts.

The air valve 321 is adjustably positioned on the front cover plate 205 adjacent its forward end toward the headstock. For the purpose of adjusting the valve longitudinally with respect to the plate 205, the valve is fixed by screws 331 to an adjusting plate 333. This plate has two horizontal slots 335. Screws 337 extend through these slots and are threaded in the cover plate 205. By loosening the screws 337, the adjusting plate 333 and valve 321 may be adjusted longitudinally relative to the cover plate, and the screws then tightened to hold the valve in adjusted position. The operating button 339 of the valve extends in rearward direction away from the headstock.

The air valve 323, which is a stop valve, is adjustably positioned on the front cover plate 205 at the rearward end of the slot 319. For the purpose of adjusting this valve longitudinally with respect to the plate 205, it is fixed by screws 341 to an adjusting plate 343. This plate has two elongate horizontal slots 345. Screws 347 extend through these slots and are threaded in the cover plate 205. By loosening the screws 347, the adjusting plate 343 and stop 323 may be adjusted longitudinally relative to the cover plate, and the screws then tightened to hold the valve in adjusted position. The operating button 349 of the stop valve 323 extends forward toward the headstock.

A rack adjusting sleeve 351 is threaded in the end of the housing 205 toward the headstock. A set screw 352 (Fig. 2) is provided for locking the sleeve in adjusted position. The sleeve has a knurled knob 353 on its outer end and a bushing 355. Slidable in the sleeve is a stop rod 357. This has a head 359 on its rearward end within the housing engageable on one side by the forward end of the rack 189 and on its other side by the inner end of the sleeve. The forward end of the stop rod toward the headstock is engageable with an air-operated bed clamp 361 (Figs. 2 and 22) which functions as a stop to prevent forward movement of the rod and rack.

Figure 2:
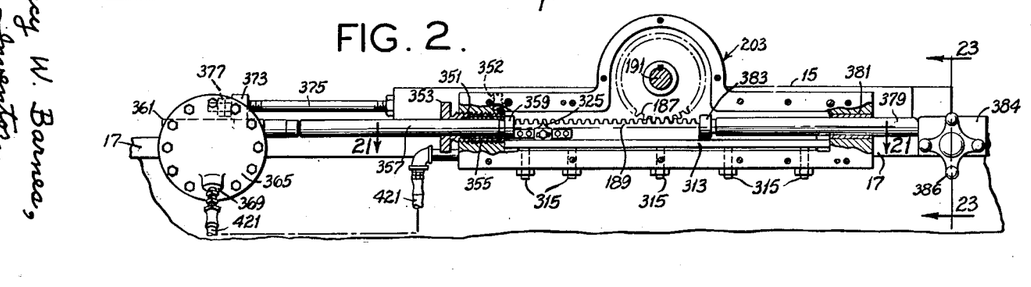
Fig. 2 is an enlarged fragment of Fig. 1, with parts broken away and shown in section.

The clamp 361 comprises a C-shaped body (Fig. 22) which is slidable on the way 17 at the front of the bed 1. It has a movable jaw 363 actuated by an air pressure device 365. The latter comprises a chamber having a diaphragm 366 adapted to be moved against the bias of a spring 367 upon introduction of air under pressure through a port 369. A connecting rod 371 extends from the diaphragm to the jaw 363. When air is supplied to the chamber, the jaw 363 is moved to clamp to the way 17. When the chamber is vented through port 369, the jaw is released to allow the bed clamp to slide on the way. The clamp has an upstanding apertured lug 373. A carriage stop adjusting rod or screw 375 extends from the forward end of the carriage 15 loosely through this lug, and has an abutment or nut 377 adjustably threaded on its forward end forward of the lug.

A stop rod 379 (Figs. 2, 20 and 21) is slidable in a bushing 381 in the rearward end of the housing 205. This has a head 383 on its forward end within the housing engageable by the rearward end of the rack 189. The rearward end of the rod 379 is engageable with a carriage stop clamp 384 (Fig. 23). This consists of a C-shaped body provided with a clamp screw 385 having a knob 386 for clamping it to the way 17 at the front of the bed.

Referring now to Fig. 25, the die head operating cylinder 173, the split nut control cylinder 305 and the bed clamp 361 are shown to be connected in an air pressure system including the previously mentioned valves 321 and 323, and also including a valve 387 carried by the carriage 15 and controlled by the lever 293, a master valve 389, and a time delay or sequence valve 391. Valves 389 and 391 are carried by the carriage 15.

The valve 321 is a pilot vent valve having a valve member operable by its push button 339 to vent a valve port 393 to atmosphere.

The stop valve 323 is a pilot valve having a valve member operable by its push button 349 to allow flow of air from a valve inlet 395 to a valve outlet 397. Normally the inlet is blocked from the outlet.

The lever-controlled valve 387 is a three-way pilot valve having a valve member 398 movable by the lever to an active position for flow of air from a valve inlet 399 to a valve outlet 401. In the inactive position of the valve member, the inlet 399 is blocked from the outlet, and the outlet 401 is vented. This valve is opened when the lever 293 is swung to engage the half-nuts 273 with the lead screw 23, being closed when the lever is in disengaged position.

The master valve 389 is a four-way air-controlled valve of a type having a control cylinder and a valve operating member normally held in an inactive position by the force of air supplied through the valve inlet 403 to the control cylinder on one side of a piston therein. It also has a control port 405 through which air may be introduced on the other side of the piston to set the valve in active position. In the active position of the valve, air from the air inlet 403 is supplied to a transfer port 407. The master valve also has an exhaust port 409. In the inactive position of the valve, the transfer port 407 is blocked from the air inlet 403 and vented through the exhaust port 409.

The time delay or sequence valve 391 is a pilot-operated type of valve having an air inlet 411, a transfer port 413, an exhaust port 414 and valve mechanism which acts upon supply of air to the inlet to block the exhaust port and to supply air from the inlet to the transfer port a predetermined time interval after introduction of air under presure to the inlet. In the absence of pressure in the inlet, the transfer port is vented through the exhaust port 414.

Details of the valves are not herein disclosed as suitable valves for the purposes described are well known and commercially available. For example, valves 321 and 323 may be PCB–22 pilot valves manufactured by the Ross Operating Valve Company of Detroit, Michigan. Valve 387 may be this company's PCB–65 pilot valve. The master valve 389 may be this company's MV–101–M2 valve. The valve 391 may be this company's ST-100 time delay valve. Reference is made to this company's catalog No. 5, for example.

At 415 is shown an air supply line, supplying air under pressure from a suitable source (not shown) to the inlet 403 of the master valve 389, the inlet 399 of lever-controlled valve 401, and to the inlet 395 of stop valve 323. The outlet 397 of the stop valve 323 is connected by a line 417 to the control port 405 of the master valve, and by a line 419 to the port 393 of valve 321. The outlet 401 of lever-controlled valve 387 is connected by a line 421 to the bed clamp 361. The transfer port 407 of the master valve is connected by a line 423 to the inlet 411 of the time delay valve 391, and by a line 425 to the control cylinder 173 for the cam ring 131. The outlet 413 of the time delay valve is connected by a line 427 to the inlet 311 of the split-nut control cylinder 305.

Referring to Figs. 11 and 15, threading dial 429 is provided to assure correct timing of engagement of the half-nuts 273 with the lead screw 23 when a thread is cut in two passes, a roughing pass and a finishing pass, so that when the finishing pass is made the chasers will follow the original cut. This dial is fixed on the upper end of a vertical shaft 431 rotary in a bearing 433 mounted on the carriage 15. Fixed on the lower end of this shaft below the carriage in rolling engagement with the lead screw 23 is a pinion 435. The dial 429 has eight marks at 45° intervals (Fig. 11). Four of the marks at 90° intervals are numbered 1, 2, 3 and 4, the remainder not being numbered. As the carriage 15 travels on the bed, the dial turns due to the rolling engagement of the pinion 435 with the lead screw.

Operation is as follows:

It will be understood that the variables involved in cutting a thread on a pipe are the size of the pipe, the thread length, the thread pitch, the thread taper, and the thread form. The requirement as to thread form is taken care of by the form of the serrations on the cutting face of the chaser. For cutting different thread forms, different chasers are used. The requirements as to thread length and size of pipe are wholly taken care of by the apparatus, as will be made clear. The requirements as to pitch and thread taper are taken care of in part by adjustment of the apparatus and in part by use of different chasers.

Assuming that it is desired to cut in one pass a thread of a given form, pitch, taper and length on a pipe of given outside diameter, the pipe is chucked in the headstock in such manner as to project from the inboard chuck 9 toward the die head 3. In working on a short pipe only the inboard chuck 9 is used. For longer work, both the inboard chuck 9 and outboard chuck 11 are used. The length of pipe projecting from the face of the chuck 9 will depend upon whether the end of the pipe has been previously prepared for threading. If the pipe has not been previously prepared, the mechanism 89 is used to cut off, bevel and ream the end of the pipe in preparation for threading, this being standard practice.

With appropriate chasers as related to the desired thread form, thread pitch and thread taper in place in the die head, and with screws 123 adjusted to insure equal distribution of cut of the chasers, the apparatus is set up for the proper speed ratio between the connecting shaft 41 and the lead screw as related to the pitch of the thread to be cut by placement of the proper change gear at 73 on the end of the lead screw 23 in the housing 35. To change gears at 73, the nut 79 is released, allowing the sector plate 69 to be swung to disengage gears 71 and 73. Then after the change gear is fixed on the end of the lead screw, the sector plate is swung back to re-engage gears 71 and 73, and locked in position by tightening the nut 79. A gear chart may be supplied for information as to the change gears needed for the desired thread pitch.

The apparatus is set up for the proper speed ratio between the rate of travel of the carriage 15 and the rate of rotation of the scroll ring 103 as related to the taper of the thread to be cut by shifting the cluster 225 in the selector gear box 197 to obtain meshing of that gear set which will derive the rate of outward movement of the chasers consistent with the desired taper. It will be understood that the greater the taper, the greater must be the ratio of the rate of outward movement to the speed of the carriage.

Figure 4:
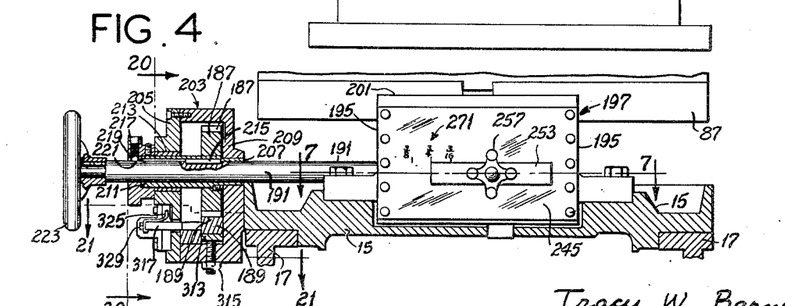
Fig. 4 is an enlarged vertical section taken on line 4—4 of Fig. 1.
Figure 5:
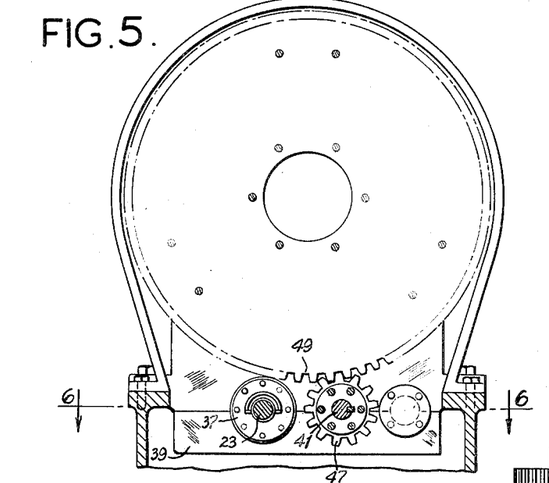
Fig. 5 is an enlarged vertical section taken on line 5—5 of Fig. 1.
Figure 6:
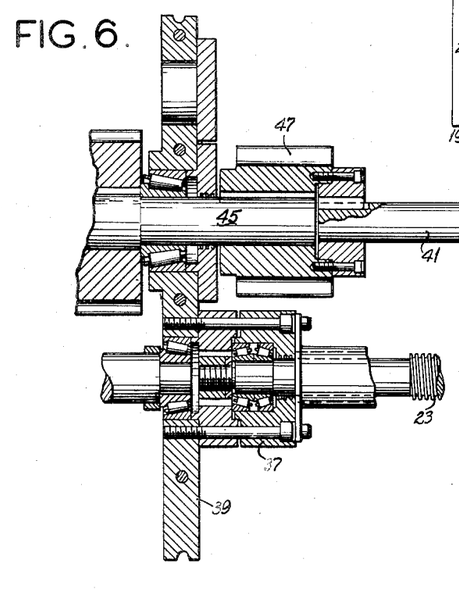
Fig. 6 is an enlarged horizontal section taken on line 6—6 of Figs. 1 and 5.

The apparatus is set up for the size of pipe to be threaded by pulling out the knob 217 to slide the sleeve 211 and the pinion 187 to the left as viewed in Fig. 4, thereby to disengage the pinion from the rack 189. Then the handwheel 223 is manually turned to rotate the scroll ring 103 and move the chasers in or out, as required, until the graduation G corresponding to the pipe size is visible in the window 186 and in register with the index mark I.

The apparatus is set up for thread length by loosening the screws 337 and 347 (Figs. 20 and 21) to allow longitudinal adjustment of the adjusting plates 333 and 343 and the valves 321 and 323 carried by these plates. The stop rod 357 is pushed in to push the rack 189 relative to the carriage 15 to the position wherein the pointer 325 on the trip 317 aligns with the desired thread length graduation on the thread length scale 327. This is accomplished while the pinion 187 is disengaged from the rack, allowing for motion of the rack independently of the pinion. Then the pinion 187 is re-engaged with the rack by pushing in the knob 217. In case this results in a slight movement of the rack and the pointer one way or the other, due to the necessity of obtaining meshing of the pinion and rack teeth, the pointer is adjusted relative to the rack to bring it back into registry with the desired thread length graduation on the scale 327.

The stop valve 323 is then adjusted longitudinally until its push button 349 engages the rearward side of the trip 317, and screws 347 are tightened to hold this valve in adjusted position. Then by turning the handwheel 31 the carriage 15 is moved manually to the right as viewed in Figs. 1, 2, 20 and 21 to the point where the pointer 325 is in register with the zero mark to the left of the left end of the thread length scale 327. It will be understood that the half-nuts 273 are at this time disengaged from the lead screw 23. Upon movement of the carriage to the right to bring it to the zero position, the stop valve 323 moves away from the trip 317 a distance equal to the desired thread length plus pre-travel for chaser throat action. During this movement of the carriage the rack 189 is held against movement to the right by its engagement with the head 383 on the forward end of the stop rod 379 and the engagement of the outer end of this stop rod with the clamp 381. The pinion 187 rolls on the rack in such direction as to move the chasers inward to proper position for starting the cutting of the taper thread on the particular size of pipe.

The rack-adjusting sleeve 351 is then turned by knob 353 until the inner end of the sleeve has moved the head 359 on the end of stop rod 357 into engagement with the end of the rack 189. Then the reset valve 321 is adjusted until its push button 339 engages the trip 317. Screws 337 are then tightened to hold the valve in adjusted position. The nut 377 (Fig. 2) is then adjusted to close the gap between the bed clamp 361 and the forward end of the stop rod 357. Fine size adjustment is made by screwing sleeve 351 in or out, and locking it in position by set screw 352.

Figure 20:
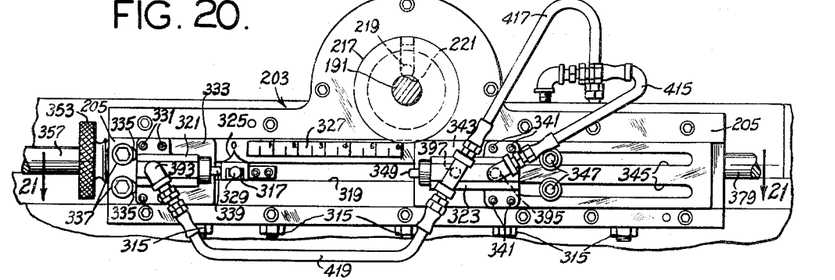
Fig. 20 is a vertical section taken on line 20—20 of Fig. 4.
Figure 21:
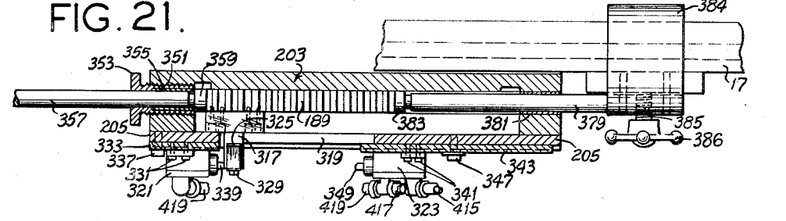
Fig. 21 is a horizontal section taken on line 21—21 of Figs. 4 and 20.
Figures 22, 23:
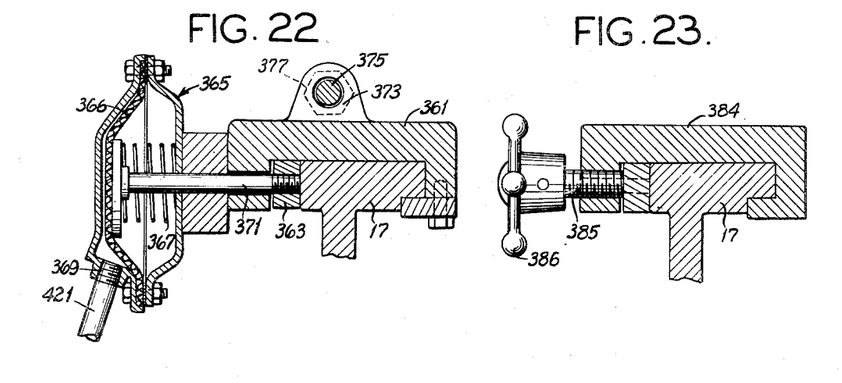
Fig. 22 is a vertical section taken on line 22—22 of Fig. 1.
Fig. 23 is a vertical section taken on line 23—23 of Fig. 2.

The above set-up for thread length results in positioning of the parts illustrated in Figs. 1, 2, 20 and 21. It will be seen that as a result of the set-up, the push buttons 339 and 349 of valves 321 and 323 are longitudinally spaced a distance equal to the desired thread length plus the pre-travel distance plus the width of the trip 317, and that the trip is engaged with the button 339 of the valve 321 (Figs. 20 and 21).

To cut a thread on the pipe, the pipe is chucked in the headstock and, if not previously prepared for threading, is cut off, beveled and reamed by mechanism 89. This is accomplished with the handle 153 swung to open-die position. After this operation, the carriage is manually moved to the extreme right until the stop rod 379 engages the clamp 384, and the handle 153 is moved to finish cut position. This sets the chasers in starting position.

Then the carriage is manually moved to the left until the edges of the throats of the chasers are in line with the end of the pipe. As the carriage is moved to the left, the rack 189 moves along with it, so that there is no relative motion as between the rack and the pinion 187. This is because the bed clamp 361 is loose on the bed and is simply pushed to the left as the carriage is moved to the left. Thus, there is nothing to impede the motion of the rack to the left along with the carriage. The trip 317 on the rack remains in engagement with the push button 339 of the reset valve 321, and the pointer 325 remains on the zero mark on the thread length scale.

Now the operator throws the half-nut shifting lever 293 to engage the half-nuts with the lead screw, which is rotating in such direction that the carriage is thereupon driven forward toward the headstock at the proper speed determined by the change gear at 73. As soon as the lever 293 is swung to the closed position, the valve 387 is actuated to supply air from the supply line 415 to the line 421 leading to the bed clamp 361. This immediately effects locking of the bed clamp to the bed, so that the rack 189 is held against forward movement. Then, as the carriage moves forward, the pinion 187 rolls on the rack and rotates to drive the scroll ring 103 at a rate dependent upon the setting of the cluster 225. This effects receding action of the chasers at a rate so related to their forward movement toward the headstock that they cut a taper thread on the end of the pipe with the desired taper. Also, the rate of forward movement of the chasers toward the headstock is so related to the speed of rotation of the pipe that the thread is cut with the desired pitch.

When the carriage has traveled toward the headstock a distance equal to the pre-set thread length, the push button 349 of the stop valve 323 engages the trip 317 on the rack 189 and the valve 323 is opened to allow flow of air from its inlet 395 to its outlet 397. Thereupon air under pressure is supplied from supply line 415 through the valve to lines 417 and 419. Line 417 delivers air to the master valve 389 through the control port 405. This acts on the control cylinder of the master valve to set this valve to supply air from supply line 415 to the port 407 and thence to lines 423 and 425. Line 425 delivers air to the cam ring control cylinder 173 and this cylinder operates to rotate the cam ring 131 to open-die position, thereby effecting quick retraction of the chasers outward from the pipe when the desired length of thread has been cut. Line 423 delivers air to the inlet 411 of time delay valve 391. After a time delay, the valve 391 supplies air from line 423 to the valve outlet 413 and thence through line 427 to the split-nut control cylinder 305. This drives the piston 307 forward to disengage the half-nuts 273 from the lead screw, this being accompanied by swinging of the lever 293 from its closed to its open position, and by resetting of the valve 387. Upon this resetting of the valve 387, the bed clamp 361 is vented back through line 421 to release its grip on the bed so that it may slide freely thereon.

After completion of the cutting of the thread as above described, the chasers occupy their open-die position wherein they are spaced outward from the pipe a distance equal to the sum of the amount of recession for taper effected by the rotation of the scroll ring and the amount of outward movement effected by axial retraction of the wedges 125 resulting from rotation of the cam ring 131 to open-die position. The half-nuts 273 are disengaged from the lead screw. The bed clamp 361 is free to slide on the bed. The carriage 15 is then manually retracted by means of handwheel 31 away from the headstock as far as permitted by the stop clamp 384. Upon this retraction of the carriage, the pinion 187 rolls on the rack 189 and rotates in reverse direction to drive the scroll ring 103 in reverse direction thereby to effect inward movement of the chasers through a distance equal to the previous outward recession for taper. At the termination of the retraction of the carriage, the push button 339 of the reset valve 321 engages the trip 317 on the rack 189 and the valve 321 is opened to vent lines 419 and 417. This vents the control cylinder of the master valve 389, and the latter resets. This results in venting of 423 and 425 through the master valve exhaust port 409, and in venting of line 427 through the exhaust port 414, thereby venting the cam ring control cylinder 173 and the half-nut control cylinder 305. With the cam ring control cylinder 173 vented, the cam ring 131 may be swung manually by the handle 153 to the finish cut or rough cut position. With the half-nut control cylinder 305 vented, the lever 293 may be swung to closed position.

Once the apparatus is set up to cut a given thread on a given size of pipe, threads may be cut successively on pipes of this size without requiring any further setting or adjustment of the apparatus between successive cuts. After any one pipe has been threaded, it is necessary only to take this pipe out of the headstock, chuck the next pipe in the headstock, and repeat the operations as above described. This is possible because threading may be started at any location off the end of the pipe without requiring any change in the initial set-up of the apparatus. With the bed clamp 361 loose on the bed, the carriage 15 may be moved to any position on the bed forward of its retracted position as determined by the stop clamp 384 without rotating the pinion 187 and without changing the relative position of the trip 317 on the rack with respect to the stop valve 323.

If a thread is to be cut in two passes (a roughing pass and a finishing pass), as for example when an exceptionally smooth finish is required on a pipe made of a tough alloy steel, a roughing pass is made with the handle 153 and cam ring 131 in rough cut position. Then the carriage is retracted and the handle 153 moved to finish cut position, and a finishing pass is made. This may be carried out without any change in the initial set-up or adjustment of the apparatus. When cutting a thread in two passes, the threading dial 429 is utilized to assure the correct timing in engagement of the half-nuts 273 on the lead screw 23 so that, in making the finishing pass, the chasers will follow the initial rough cut. In cutting even threads (8, 10, 12 etc.), the half-nuts may be closed at any numbered line on the dial. In cutting half numbered threads (8½, 10½, 11½, etc.), the half-nuts may be closed at any one-half revolution such as 1 and 3, 2 and 4, etc. In cutting quarter threads (7¼, 8¼, 9¼, etc.), the half-nuts must be closed at the same line on the dial.

If it is desired to cut a left hand thread instead of a right hand thread, a bolt carrying an idler gear is threaded in the tapped hole 81 in the sector plate 69. The arrangement is such that this idler gear is interposed between and in mesh with gears 71 and 73. It will be understood that for left hand threading the direction of rotation of pinion 47 is reversed to reverse the direction of rotation of the pipe. With the idler gear in use, despite this reversal of rotation of pinion 47 resulting in reversal of rotation of shaft 41, the lead screw is rotated in the same direction as for right hand threading so as to advance the carriage 15 when the half-nuts are engaged with the lead screw.

While the invention is disclosed herein as embodied in a threading apparatus of the tangential receding chaser type for cutting taper threads, it will be understood that many of its features may be used in a standard threading apparatus of the non-receding chaser type wherein the chasers remain fixed with respect to the die head in making a cutting pass. For example, the entire die head 3 may be used in a standard apparatus, without the use of any gear train for driving the gear 105 on the scroll ring 103. In this case, I provide a pinion in mesh with the gear 105 which is manually turned to move the chasers in or out until the graduation G corresponding to the pipe size is visible in the window 186 in register with the index mark I.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a thread cutting apparatus, a die head comprising an annular body, a plurality of slides carried by the body for inward and outward sliding movement relative to work to be threaded, the work extending axially through the body, a scroll ring carried by the body and rotary relative to the body, each slide having a partial scroll in mesh with the scroll of the scroll ring for effecting gradual inward and outward movement of the slides for taper thread cutting upon rotation of the scroll ring, a chaser assembly associated with each slide, each chaser assembly being slidable in and out relative to its respective slide, each slide having an inwardly facing abutment opposed to the outer end of the respective chaser assembly, axially movable wedges interposed between said abutments and the outer ends of the chaser assemblies, and means for controlling the axial position of the wedges thereby controlling the position of each chaser assembly relative to its slide for effecting quick retraction of the chaser assemblies to open-die position relative to the slides.

2. A die head as set forth in claim 1 wherein the chaser assemblies are biased outward by springs reacting from the slides.

3. In a thread cutting apparatus, a die head comprising an annular body, a plurality of slides carried by the body for inward and outward sliding movement relative to work to be threaded, the work extending axially through the body, means associated with the body for gradually moving the slides in and out for taper thread cutting, a chaser assembly associated with each slide, each chaser assembly being slidable in and out relative to its respective slide, each slide having an inwardly facing abutment at its outer end opposed to the outer end of the respective chaser assembly, each chaser assembly having an axially directed wedge surface at its outer end, axially movable wedges interposed between the abutments and wedge surfaces, the wedges also being movable in and out with the slides and chaser assemblies, springs reacting from the slides biasing the chaser assemblies outward relative to the slides, and a cam ring rotary on the body having cams thereon engaging the wedges and controlling their axial position for effecting quick retraction of the chaser assemblies to open-die position relative to the slides.

4. A die head as set forth in claim 3 wherein the means for moving the slides in and out comprises a scroll ring carried by the body and rotary relative to the body, each slide having a partial scroll in mesh with the scroll of the scroll ring.

5. A die head as set forth in claim 3 wherein the abutments on the slides are screws threaded in the outer ends of the slides extending in the direction of movement of the slides.

6. A die head as set forth in claim 3 wherein the cams on the cam ring are formed to establish axial positions of the wedges corresponding to finish cut, rough cut and open-die positions of the chaser assemblies relative to the slides.

7. A die head as set forth in claim 6 further provided with a latch carried by the cam ring and a multi-position stop for the latch on the body, the stop determining positions of the cam ring corresponding to the finish cut, rough cut and open-die positions.

8. A die head as set forth in claim 6 wherein the cam ring has a handle, and a latch is associated with the handle engageable with a multi-position stop on the body, the stop determining positions of the cam ring corresponding to the finish cut, rough cut and open-die positions.

9. A die head as set forth in claim 3 having a fluid pressure device for effecting rotation of the cam ring.

10. A die head as set forth in claim 9 wherein the fluid pressure device comprises a cylinder and piston connected between the cam ring and body.

11. In a thread cutting apparatus, a die head comprising an annular body, a plurality of slides carried by the body for inward and outward sliding movement on one face of the body, the body having an annular recess in back of the slides, a scroll ring rotary in the recess, each slide having on its back face a partial scroll in mesh with the scroll of the scroll ring for effecting gradual inward and outward movement of the slides for taper thread cutting upon rotation of the scroll ring, a chaser assembly associated with each slide, each chaser assembly being slidable in and out relative to its respective slide on the front of the slide, each slide having an inwardly facing abutment at its outer end opposed to the outer end of the respective chaser assembly, wedges interposed between the abutments and the outer ends of the chaser assemblies, said wedges being movable axially toward and away from the slides and movable in and out with the slides and chaser assemblies, springs reacting from the slides biasing the chaser assemblies outward relative to the slide, said wedges being so formed that upon axial movement away from the slides the springs move the chaser assemblies outward relative to the slides and upon axial movement toward the slides the wedges force the chaser assemblies inward relative to the slides against the bias of the springs, and a cam ring carried by the body for rotation on the axis of the body in front of the wedges and having cams thereon engaging the wedges and controlling their axial position for effecting quick retraction of the chaser assemblies to open-die position relative to the slides.

12. A die head as set forth in claim 11 wherein the cams on the cam ring are formed to establish axial positions of the wedges corresponding to finish cut, rough cut and open-die positions of the chaser assemblies relative to the slides.

13. A die head as set forth in claim 12 further provided with a latch carried by the cam ring and a multi-position stop for the latch on the body, the stop determining positions of the cam ring corresponding to the finish cut, rough cut and open-die positions.

14. A die head as set forth in claim 12 wherein the cam ring has a handle, and a latch is associated with the handle engageable with a multi-position stop on the body, the stop determining positions of the cam ring corresponding to the finish cut, rough cut and open-die positions.

15. A die head as set forth in claim 11 having a fluid pressure device for effecting rotation of the cam ring.

16. A die head as set forth in claim 15 wherein the fluid pressure device comprises a cylinder and piston connected between the cam ring and body.

17. A die head as set forth in claim 11 wherein the scroll ring has a coaxial gear, and the body carries a pinion in mesh with the gear.

References Cited in the file of this patent

UNITED STATES PATENTS

| Number | Name | Date |
|---|---|---|
| 1,350,861 | Flynn | Aug. 24, 1920 |
| 1,756,277 | Breitenstein | Apr. 29, 1930 |
| 1,797,944 | Dustan | Mar. 24, 1931 |
| 1,991,636 | Sternberg | Feb. 19, 1935 |
| 2,017,764 | Mathias | Oct. 15, 1935 |
| 2,114,626 | Brinkman | Apr. 19, 1938 |
| 2,130,119 | Drissner | Sept. 13, 1938 |
| 2,219,944 | Schoepe | Oct. 29, 1940 |
| 2,224,691 | Pealer | Dec. 10, 1940 |

FOREIGN PATENTS

| Number | Country | Date |
|---|---|---|
| 441,303 | Great Britain | Jan. 16, 1936 |